(12) United States Patent
Paulraj et al.

(10) Patent No.: US 11,507,288 B2
(45) Date of Patent: Nov. 22, 2022

(54) DETECTING AND RECONFIGURING OF BOOT PARAMETERS OF A REMOTE NON-VOLATILE MEMORY EXPRESS (NVME) SUBSYSTEM

(71) Applicant: Dell Products L.P., Round Rock, TX (US)

(72) Inventors: Deepaganesh Paulraj, Bangalore (IN); Chandrasekhar Puthillathe, Bangalore (IN); Manjunath A M, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/231,437

(22) Filed: Apr. 15, 2021

(65) Prior Publication Data
US 2022/0334741 A1    Oct. 20, 2022

(51) Int. Cl.
*G06F 3/06* (2006.01)

(52) U.S. Cl.
CPC ............ *G06F 3/0632* (2013.01); *G06F 3/061* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,959,492 B2 * | 2/2015 | Detwiler ................. | G06F 9/547 717/139 |
| 2007/0143588 A1 * | 6/2007 | Sherwin ................ | G06F 9/4411 710/10 |
| 2011/0246626 A1 * | 10/2011 | Peterson ............... | G06F 9/4416 713/2 |
| 2014/0172797 A1 * | 6/2014 | Henning ............... | G06F 16/178 707/636 |
| 2015/0277937 A1 * | 10/2015 | Swanson ............... | G06F 9/4416 713/2 |
| 2018/0059982 A1 * | 3/2018 | Balakrishnan ........ | G06F 3/0632 |
| 2018/0246675 A1 * | 8/2018 | Qiu ....................... | G06F 3/0604 |

* cited by examiner

*Primary Examiner* — Gautam Sain
*Assistant Examiner* — Elias Young Kim
(74) *Attorney, Agent, or Firm* — McDermott Will & Emery LLP

(57) ABSTRACT

Detecting and reconfiguring of boot parameters of a NVMe subsystem, including identifying a mapping between local boot parameters of a NVMe subsystem and a GUID that corresponds to the NVMe subsystem; determining that the NVMe subsystem has been reset; in response to determining that the NVMe subsystem has been reset: transmitting a discovery request to the NVMe subsystem for remote boot parameters of the NVMe subsystem; comparing the local boot parameters for the GUID with the remote boot parameters for the NVMe subsystem; determining, based on the comparing, that the remote boot parameters for the NVMe subsystem do not match with the local boot parameters for the GUID, and in response, updating values of the local boot parameters for the GUID based on the remote boot parameters of the NVMe subsystem.

18 Claims, 4 Drawing Sheets

DETECTING AND RECONFIGURING OF BOOT PARAMETERS OF A REMOTE NON-VOLATILE MEMORY EXPRESS (NVME) SUBSYSTEM

BACKGROUND

Field of the Disclosure

The disclosure relates generally to an information handling system, and in particular, detecting and reconfiguring of boot parameters of a remote non-volatile memory express (NVMe) subsystem.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When a non-volatile memory express (NVMe) subsystem of an information handling system is restarted, there can be a change in boot parameters at the NVMe subsystem, limiting access to the NVMe subsystem, or wrong access to a different NVMe subsystem.

SUMMARY

Innovative aspects of the subject matter described in this specification may be embodied in a method of detecting and reconfiguring of boot parameters of a remote non-volatile memory express (NVMe) subsystem, the method including identifying a mapping between local boot parameters of a non-volatile memory express (NVMe) subsystem and a global unique identifier (GUID) that corresponds to the NVMe subsystem; determining that the NVMe subsystem has been reset; in response to determining that the NVMe subsystem has been reset: transmitting a discovery request to the NVMe subsystem for remote boot parameters of the NVMe subsystem; comparing the local boot parameters for the GUID with the remote boot parameters for the NVMe subsystem; determining, based on the comparing, that the remote boot parameters for the NVMe subsystem do not match with the local boot parameters for the GUID; and in response to determining that the remote boot parameters for the NVMe subsystem do not match with the local boot parameters for the GUID, updating values of the local boot parameters for the GUID based on the remote boot parameters of the NVMe subsystem.

Other embodiments of these aspects include corresponding systems, apparatus, and computer programs, configured to perform the actions of the methods, encoded on computer storage devices.

These and other embodiments may each optionally include one or more of the following features. For instance, accessing the NVMe subsystem based on the updated values of the local boot parameters for the GUID. The discovery request is transmitted at an integrated remote access controller. The integrated remote access controller transmits the discovery request to the NVMe subsystem over a NVMe management interface (MI). The local boot parameters include controller identifier (ID) and namespace identifier (NSID). The remote boot parameters include controller identifier (ID) and namespace identifier (NSID). Updating the values of the local boot parameters for the GUID further includes updating the values of the local boot parameters for the GUID to match values of the remote boot parameters for the NVMe subsystem.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
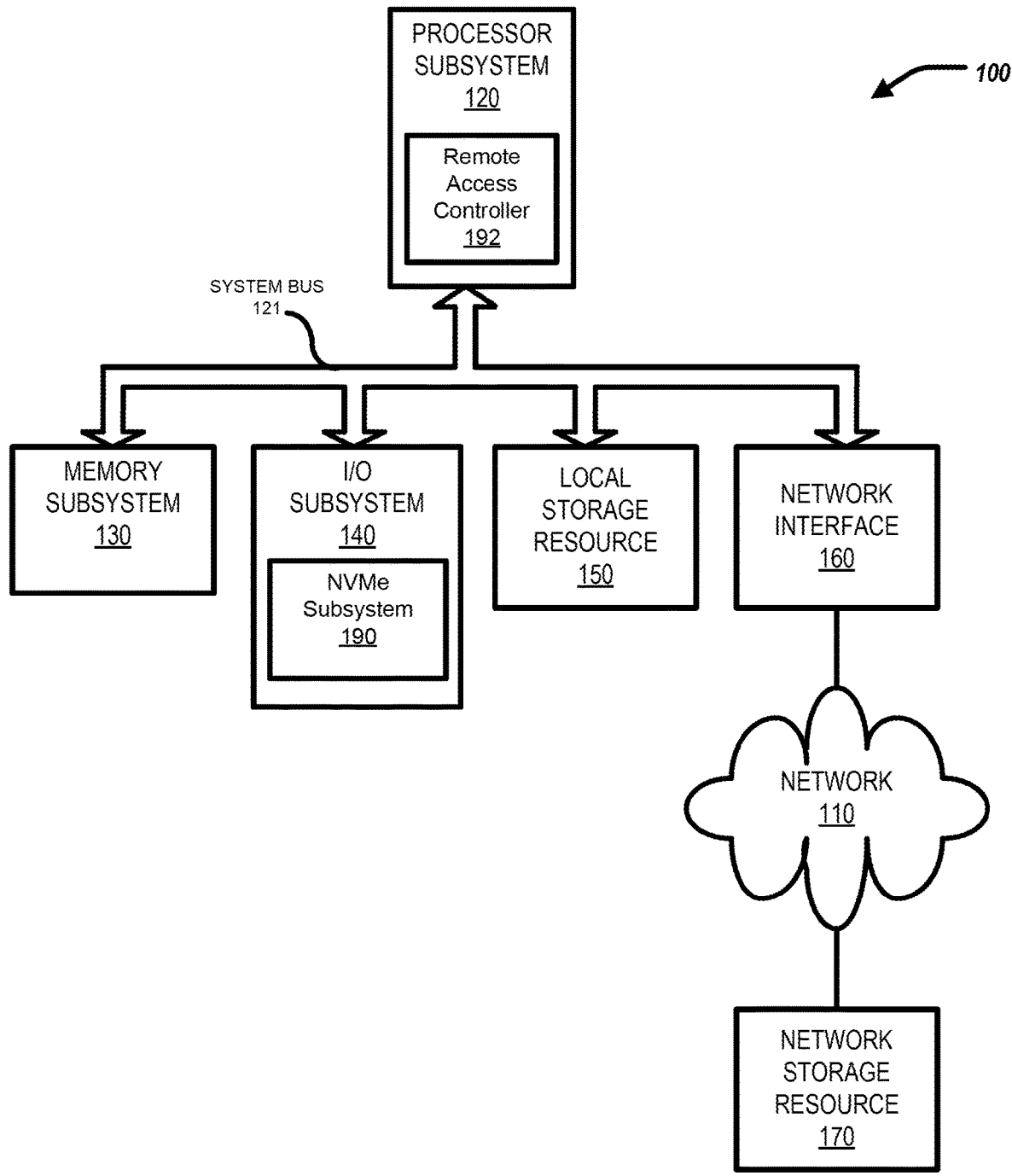
FIG. 1 is a block diagram of selected elements of an embodiment of an information handling system.

This disclosure discusses methods and systems for detecting and reconfiguring of boot parameters of a remote non-volatile memory express (NVMe) subsystem. In short, a remote access controller can detect boot parameters of the NVMe subsystem, and reconfigure locally stored boot parameters accordingly. The remote access controller can facilitate automatic detection of misconfiguration of boot parameters for the NVMe subsystem; automatic reconfiguration of the boot parameters; and auto provisioning and reconfiguration of the boot parameters against a global unique identifier for the NVMe subsystem.

Specifically, this disclosure discusses a system and a method for detecting and reconfiguring of boot parameters of a remote non-volatile memory express (NVMe) subsystem, including identifying a mapping between local boot parameters of a non-volatile memory express (NVMe) subsystem and a global unique identifier (GUID) that corresponds to the NVMe subsystem; determining that the NVMe subsystem has been reset; in response to determining that the NVMe subsystem has been reset: transmitting a discovery request to the NVMe subsystem for remote boot parameters of the NVMe subsystem; comparing the local boot parameters for the GUID with the remote boot parameters for the NVMe subsystem; determining, based on the comparing, that the remote boot parameters for the NVMe subsystem do not match with the local boot parameters for the GUID; and in response to determining that the remote boot parameters for the NVMe subsystem do not match with the local boot parameters for the GUID, updating values of the local boot parameters for the GUID based on the remote boot parameters of the NVMe subsystem.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

The I/O subsystem 140 can further include a non-volatile memory express (NVMe) subsystem 190.

Local storage resource 150 may comprise computer-readable media (e.g., hard disk drive, floppy disk drive, CD-ROM, and/or other type of rotating storage media, flash memory, (instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a remote access controller 192. The remote access controller 192 can be included by the processor subsystem 120. The remote access controller 192 can include an out-of-band management platform provided on a separate expansion card from a main board of the information handling system 100; or can include an integrated remote access controller.

In short, the remote access controller 192 can detect boot parameters of the NVMe subsystem 190, and reconfigure locally stored boot parameters accordingly. The remote access controller 192 can facilitate automatic detection of misconfiguration of boot parameters for the NVMe subsystem 190; automatic reconfiguration of the boot parameters; and auto provisioning and reconfiguration of the boot parameters against a global unique identifier for the NVMe subsystem 190.

Figure 2:
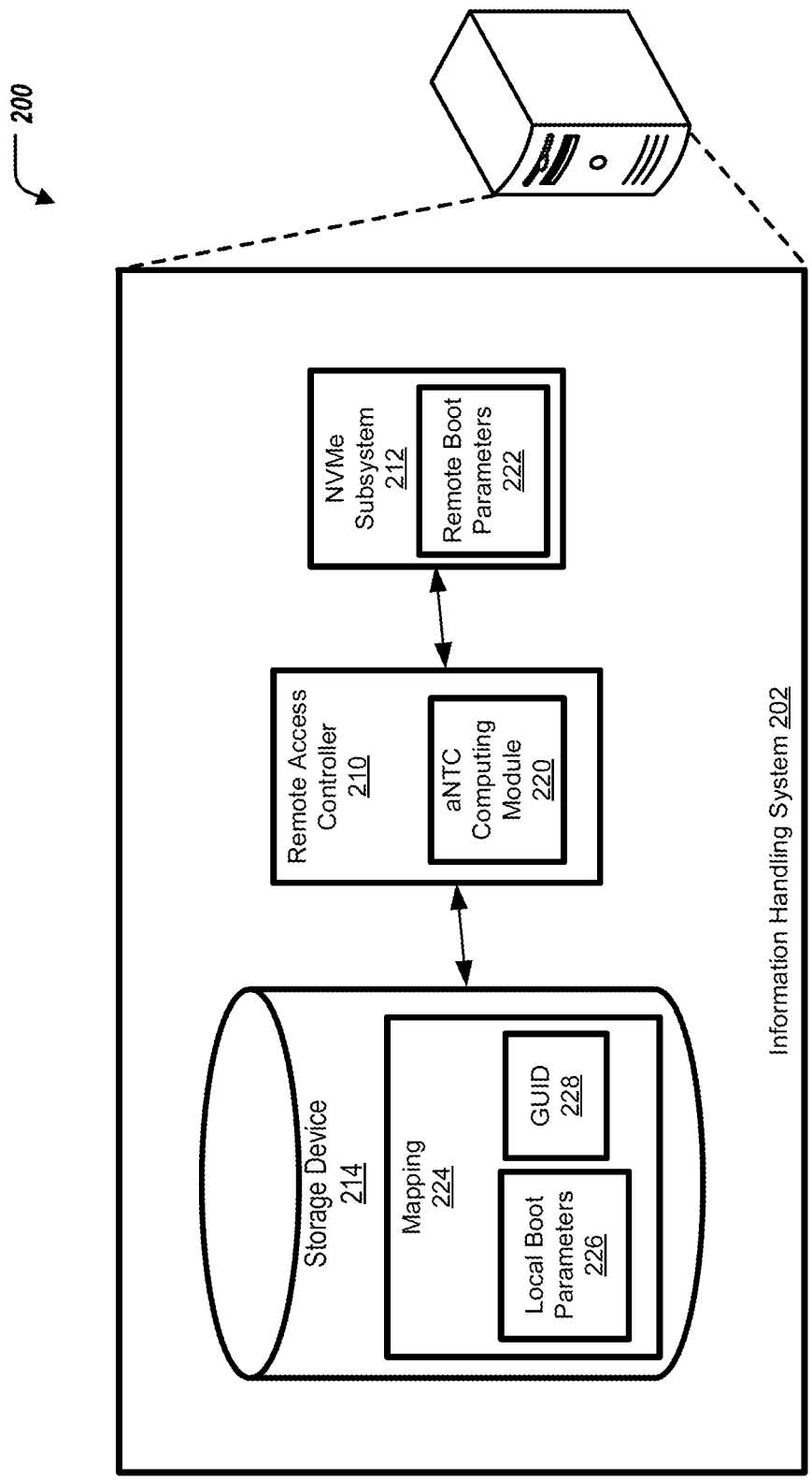
FIG. 2 illustrates a block diagram of an information handling system for detecting and reconfiguring of boot parameters of a remote non-volatile memory express (NVMe) subsystem.

Turning to FIG. 2, FIG. 2 illustrates an environment 200 including an information handling system 202. The information handling system 202 can include a remote access controller 210, a non-voltage memory express (NVMe) subsystem 212, and a storage device 214. In some examples, the information handling system 202 is similar to, or includes, the information handling system 100 of FIG. 1. In some examples, the remote access controller 210 is the same, or substantially the same, as the remote access controller 192 of FIG. 1. In some examples, the NVMe subsystem 212 is similar to, or includes, the NVMe subsystem 190 of FIG. 1.

In some examples, the remote access controller 210 can include an out-of-band management platform provided on a separate expansion card from a main board of the information handling system 202. In some examples, the remote access controller 210 can include an integrated remote access controller. For example, the remote access controller 210 can be integrated into the main board of the information handling system 202. For example, the remote access controller 210 can include an integrated Dell® Remote Access Controller (iDRAC).

The remote access controller 210 can include an adaptive NVMe target configurator (aNTC) computing module 220. The NVMe subsystem 212 can include remote boot parameters 222. The storage device 214 can include a mapping (or table) 224. The mapping 224 can map local boot parameters 226 with global unique identifiers (GUID) 228.

The remote access controller 210 can be in communication with the NVMe subsystem 212 and the storage device 214.

The remote access controller 210, and specifically, the aNTC computing module 220, can perform an initial configuration with respect to the NVMe subsystem 212. Specifically, the aNTC computing module 220 can identify the NVMe subsystem 212. The aNTC computing module 220, after identifying the NVMe subsystem 212, associates a GUID 228 with the NVMe subsystem 212, the GUID 228 stored at the mapping 224. Furthermore, the aNTC computing module 220, after identifying the NVMe subsystem 212, can transmit a discovery request to the NVMe subsystem 212 for remote boot parameters 222 of the NVMe subsystem 212. The remote boot parameters 222 can include a controller identifier (ID) and a namespace identifier (NSID) of the NVMe subsystem 212. In some examples, the remote boot parameters 222 can further include a NVMe qualified name (NQN) of the NVMe subsystem 212, a NVME world wide node name (WWNN) of the NVMe subsystem 212, and a NVMe world wide port name (WWPN) of the NVMe subsystem 212. In some examples, the aNTC computing module 220 can associate the GUID 228 with the NQN of the NVMe subsystem 212 at the mapping 224.

Figure 3:
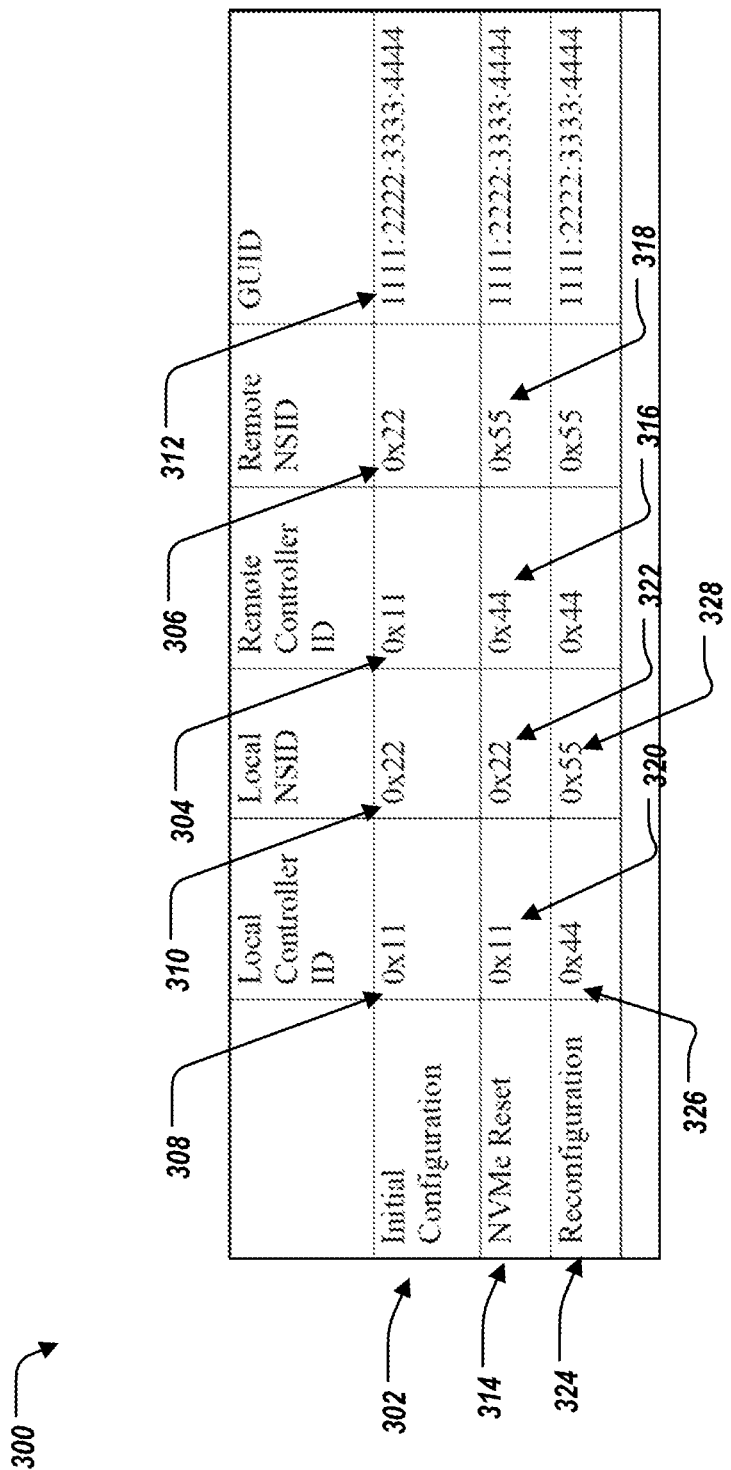
FIG. 3 illustrates a chart displaying boot parameter values.

FIG. 3 illustrates a table 300 including example values of the remote boot parameters 222 and the local boot parameters 226 after the initial configuration with respect to the NVMe subsystem 212. For example, during the initial configuration, shown by row 302, the controller ID parameter of the remote boot parameters 222, shown at 304, has a value of "0x11," and the NISD parameter of the remote boot parameters 222, shown at 306, has a value of "0x22."

The aNTC computing module 220 can store the values of the remote boot parameters 222 as local boot parameters 226 at the mapping 224. Specifically, the aNTC computing module 220 can store the values of the remote boot parameters 222 as the local boot parameters 226 for the GUID 228 that is associated with the NVMe subsystem 212.

Continuing the example of FIG. 3, during the initial configuration, shown by row 302, the controller ID parameter of the local boot parameters 226, shown at 308, has a value of "0x11," and the NISD parameter of the local boot parameters 226, shown at 310, has a value of "0x22." Thus, the aNTC computing module 220 stores the values of the remote boot parameters 222 as the local boot parameters 226. The GUID 228 for the local boot parameters 226 that is associated with the NVMe subsystem 212, shown at 312, can be "1111:2222:3333:4444."

The aNTC computing module 220 can determine that the NVMe subsystem 212 has been reset. Specifically, the NVMe subsystem 212 can be reset including restarted (e.g., due to a power cycle), rebooted, or reconfigured. When the NVMe subsystem 212 has been reset, the values of the remote boot parameters 222 can change. For example, the values of the controller ID and the NSID of the NVMe subsystem 212 can change when the NVMe subsystem 212 is reset.

Continuing the example of FIG. 3, after the NVMe subsystem 212 has been reset, shown by row 314, the controller ID parameter of the remote boot parameters 222, shown at 316, has a value of "0x44," and the NISD parameter of the remote boot parameters 222, shown at 318, has a value of "0x44."

The aNTC computing module 220, in response to determining that the NVMe subsystem 212 has been reset, can transmit a discovery request to the NVMe subsystem 212 for the remote boot parameters 222 of the NVMe subsystem 212. In some cases, the values of the remote boot parameters 222 of the NVMe subsystem 212 can change after the NVMe subsystem 212 has been reset. In some cases, the values of the remote boot parameters 222 of the NVMe subsystem 212 do not change after the NVMe subsystem 212 has been reset. In some cases, the values of a subset of the remote boot parameters 222 of the NVMe subsystem 212 change after the NVMe subsystem 212 has been reset, and the values of the remaining remote boot parameters 222 of the NVMe subsystem 212 do not change after the NVMe subsystem 212 has been reset.

In some examples, the aNTC computing module 220 can transmit the discovery request to the NVMe subsystem 212 over a NVMe management interface (MI). Specifically, the aNTC computing module 220 can transmit the discovery request to the NVMe subsystem 212 through the NVME-MI over a network controller sideband interface (NC-SI) pass-through to query the NVMe subsystem 212 for the remote boot parameters 222, such as the controller ID and the NSID of the NVMe subsystem 212.

The aNTC computing module 220, further in response to determining that the NVMe subsystem 212 has been reset, compares the local boot parameters 226 for the GUID 228 with the remote boot parameters 222 for the NVMe subsystem 212. Specifically, the aNTC computing module 220 can compare the values of the controller ID and the NSID of the GUID 228 (that corresponds to the NVMe subsystem 212) as stored by the mapping (or table) 224 with the values of the controller ID and the NSID, respectively, of the NVMe subsystem 212 that are obtained in response to the discovery request after the NVMe subsystem 212 has been reset.

The aNTC computing module 220, further in response to determining that the NVMe subsystem 212 has been reset, determines, based on comparing the local boot parameters 226 for the GUID 228 with the remote boot parameters 222 for the NVMe subsystem 212, that the remote boot parameters 222 for the NVMe subsystem 212 do not match with the local boot parameters 226 for the GUID 228. Specifically, the aNTC computing module 220 can determine that the values of the controller ID and the NSID of the GUID 228 (that corresponds to the NVMe subsystem 212) as stored by the mapping (or table) 224 do not match (mismatched) with the controller ID and the NSID, respectively, of the NVMe subsystem 212 that are obtained in response to the discovery request after the NVMe subsystem 212 has been reset.

Continuing the example of FIG. 3, after the NVMe subsystem 212 has been reset, shown by row 314, the controller ID parameter of the local boot parameters 226, shown at 320, has a value of "0x11," and the NISD parameter of the local boot parameters 226, shown at 322, has a value of "0x22." However, the controller ID parameter of the remote boot parameters 222, shown at 316, has a value of "0x44," and the NISD parameter of the remote boot parameters 222, shown at 318, has a value of "0x44." Thus, the remote boot parameters 222 are mismatched with respect to the local boot parameters 226.

The aNTC computing module 220, in response to determining that the remote boot parameters 222 for the NVMe subsystem 212 do not match with the local boot parameters 226 for the GUID 228, updates the values of the local boot parameters 226 for the GUID 228 based on the remote boot parameters 222 of the NVMe subsystem 212. Specifically, the aNTC computing module 220 can update the values of the controller ID and the NSID of the GUID 228 (that corresponds to the NVMe subsystem 212) as stored by the mapping (or table) 224 based on the values of the controller ID and the NSID, respectively, of the NVMe subsystem 212 that are obtained in response to the discovery request after the NVMe subsystem 212 has been reset. In some examples, the aNTC computing module 220 can update the values of the controller ID and the NSID of the GUID 228 (that corresponds to the NVMe subsystem 212) as stored by the mapping (or table) 224 to match the values of the controller ID and the NSID, respectively, of the NVMe subsystem 212 that are obtained in response to the discovery request after the NVMe subsystem 212 has been reset.

Continuing the example of FIG. 3, during reconfiguration, shown by row 324, the controller ID parameter of the local boot parameters 226, shown at 326, has a value of "0x44," and the NISD parameter of the local boot parameters 226, shown at 328, has a value of "0x55." Thus, the local boot parameters 226 match with respect to the remote boot parameters 222.

In some cases, the aNTC computing module 220, further in response to determining that the NVMe subsystem 212 has been reset, determines, based comparing the local boot parameters 226 for the GUID 228 with the remote boot parameters 222 for the NVMe subsystem 212, that the remote boot parameters 222 for the NVMe subsystem 212 do match with the local boot parameters 226 for the GUID 228. Specifically, the aNTC computing module 220 can determine that the values of the controller ID and the NSID of the GUID 228 (that corresponds to the NVMe subsystem 212) as stored by the mapping (or table) 224 do match with the controller ID and the NSID, respectively, of the NVMe subsystem 212 that are obtained in response to the discovery request after the NVMe subsystem 212 has been reset. The aNTC computing module 220, in response to determining that the remote boot parameters 222 for the NVMe subsystem 212 do match with the local boot parameters 226 for the GUID 228, takes no further action. That is, the aNTC computing module 220 does not update the values of the controller ID and the NSID of the GUID 228 (that corresponds to the NVMe subsystem 212) as stored by the mapping (or table) 224 based on the values of the controller ID and the NSID, respectively, of the NVMe subsystem 212 that are obtained in response to the discovery request after the NVMe subsystem 212 has been reset.

In some examples, the aNTC computing module 220 can access the NVMe subsystem 212 based on the updated values of the local boot parameters 226 for the GUID 228. That is, the aNTC computing module 220 can expose the NVMe subsystem 212 as a logical unit number (LUN) so that a basic input/output system (BIOS) of the information handling system 202 can boot from such. In other words, the aNTC computing module 220 can automatically reconfigure the high-level language attributes of the controller ID and the NSID to a fiber channel (FC) host bus adapter (HBA) over the NC-SI set address command to ensure booting of an operating system and/or a hypervisor of the information handling system 202 by the BIOS.

Figure 4:
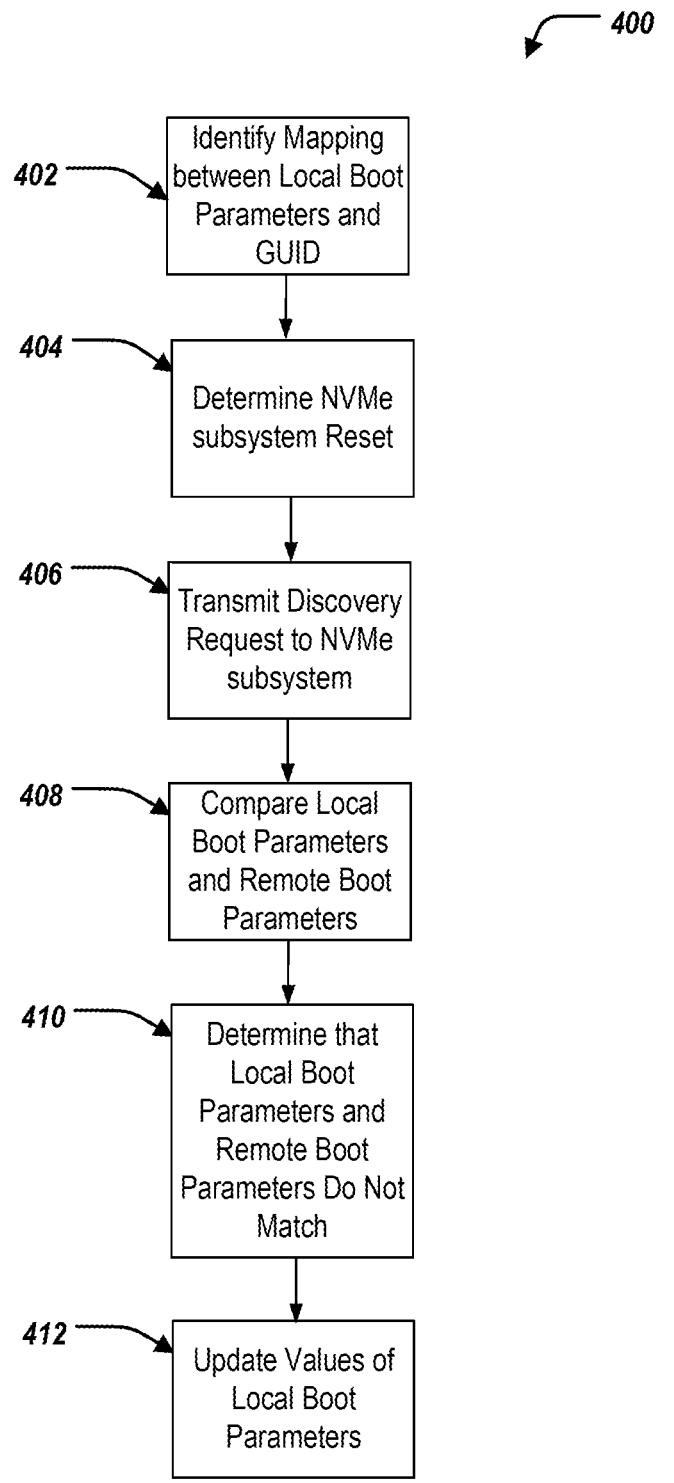
FIG. 4 illustrates a method for detecting and reconfiguring of boot parameters of a remote non-volatile memory express (NVMe) subsystem.

FIG. 4 illustrates a flowchart depicting selected elements of an embodiment of a method 400 for detecting and reconfiguring of boot parameters of a remote non-volatile memory express (NVMe) subsystem. The method 400 may be performed by the information handling system 100, the information handling system 202 and/or the aNTC computing module 220, and with reference to FIGS. 1-3. It is noted that certain operations described in method 400 may be optional or may be rearranged in different embodiments The aNTC computing module 220 identifies the mapping 224 between local boot parameters 226 of the non-volatile memory express (NVMe) subsystem 212 and the global unique identifier (GUID) 228 that corresponds to the NVMe subsystem 212 (402). The aNTC computing module 220 determines that the NVMe subsystem 212 has been reset (404). The aNTC computing module 220, in response to determining that the NVMe subsystem 212 has been reset, transmits a discovery request to the NVMe subsystem 212 for remote boot parameters 222 of the NVMe subsystem 212 (406). The aNTC computing module 220, in response to determining that the NVMe subsystem 212 has been reset, compares the local boot parameters 226 for the GUID 228 with the remote boot parameters 222 for the NVMe subsystem 212 (408). The aNTC computing module 220 determines, based on the comparing, that the remote boot parameters 222 for the NVMe subsystem 212 do not match with the local boot parameters 226 for the GUID 228 (410). The aNTC computing module 220, in response to determining that the remote boot parameters 222 for the NVMe subsystem 212 do not match with the local boot parameters 226 for the GUID 228, updates values of the local boot parameters 226 for the GUID 228 based on the remote boot parameters 222 of the NVMe subsystem 212 (412).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of detecting and reconfiguring of boot parameters of a remote non-volatile memory express (NVMe) subsystem, the method comprising:

identifying a mapping between local boot parameters of a non-volatile memory express (NVMe) subsystem and a global unique identifier (GUID) that corresponds to the NVMe subsystem;

determining that the NVMe subsystem has been reset;

in response to determining that the NVMe subsystem has been reset:

transmitting a discovery request to the NVMe subsystem for remote boot parameters of the NVMe subsystem;

comparing values of a first subset and values of a second subset of the local boot parameters for the GUID with values of the remote boot parameters for the NVMe subsystem;

determining, based on the comparing, that values of a first subset of the remote boot parameters for the NVMe subsystem do not match with values of the local boot parameters for the GUID;

in response to determining that the values of the first subset of the remote boot parameters for the NVMe subsystem do not match with the values of the local boot parameters for the GUID, updating the values of the local boot parameters for the GUID to correspond to the values of the first subset of the remote boot parameters of the NVMe subsystem;

determining, based on the comparing, that values of a second subset of the remote boot parameters for the NVMe subsystem match with values of the local boot parameters for the GUID, the second subset of the remote boot parameters differing from the first subset of the remote boot parameters; and in response to determining that the values of the second subset of the remote boot parameters of the NVMe substation match with the values of the local boot parameters of the GUID, retaining the values of the local boot parameters for the GUID that correspond with the second subset of the remote boot parameters of the NVMe subsystem.

2. The computer-implemented method of claim 1, further comprising accessing the NVMe subsystem based on the updated values of the local boot parameters for the GUID.

3. The computer-implemented method of claim 1, wherein the discovery request is transmitted from an integrated remote access controller.

4. The computer-implemented method of claim 3, wherein the integrated remote access controller transmits the discovery request to the NVMe subsystem over a NVMe management interface (MI).

5. The computer-implemented method of claim 1, wherein the local boot parameters include controller identifier (ID) and namespace identifier (NSID).

6. The computer-implemented method of claim 1, wherein the remote boot parameters include controller identifier (ID) and namespace identifier (NSID).

7. An information handling system comprising a processor having access to memory media storing instructions executable by the processor to perform operations comprising, comprising:
identifying a mapping between local boot parameters of a non-volatile memory express (NVMe) subsystem and a global unique identifier (GUID) that corresponds to the NVMe subsystem;
determining that the NVMe subsystem has been reset;
in response to determining that the NVMe subsystem has been reset:
transmitting a discovery request to the NVMe subsystem for remote boot parameters of the NVMe subsystem;
comparing values of a first subset and values of a second subset of the local boot parameters for the GUID with values of the remote boot parameters for the NVMe subsystem;
determining, based on the comparing, that values of a first subset of the remote boot parameters for the NVMe subsystem do not match with values of the local boot parameters for the GUID;
in response to determining that the values of the first subset of the remote boot parameters for the NVMe subsystem do not match with the values of the local boot parameters for the GUID, updating the values of the local boot parameters for the GUID to correspond to the values of the first subset of the remote boot parameters of the NVMe subsystem;
determining, based on the comparing, that values of a second subset of the remote boot parameters for the NVMe subsystem match with values of the local boot parameters for the GUID, the second subset of the remote boot parameters differing from the first subset of the remote boot parameters; and
in response to determining that the values of the second subset of the remote boot parameters of the NVMe substation match with the values of the local boot parameters of the GUID, retaining the values of the local boot parameters for the GUID that correspond with the second subset of the remote boot parameters of the NVMe subsystem.

8. The information handling system of claim 7, the operations further comprising accessing the NVMe subsystem based on the updated values of the local boot parameters for the GUID.

9. The information handling system of claim 7, wherein the discovery request is transmitted from an integrated remote access controller.

10. The information handling system of claim 9, wherein the integrated remote access controller transmits the discovery request to the NVMe subsystem over a NVMe management interface (MI).

11. The information handling system of claim 7, wherein the local boot parameters include controller identifier (ID) and namespace identifier (NSID).

12. The information handling system of claim 7, wherein the remote boot parameters include controller identifier (ID) and namespace identifier (NSID).

13. A non-transitory computer-readable medium storing software comprising instructions executable by one or more computers which, upon such execution, cause the one or more computers to perform operations comprising:
identifying a mapping between local boot parameters of a non-volatile memory express (NVMe) subsystem and a global unique identifier (GUID) that corresponds to the NVMe subsystem;
determining that the NVMe subsystem has been reset;
in response to determining that the NVMe subsystem has been reset:
transmitting a discovery request to the NVMe subsystem for remote boot parameters of the NVMe subsystem;
comparing values of a first subset and values of a second subset of the local boot parameters for the GUID with values of the remote boot parameters for the NVMe subsystem;
determining, based on the comparing, that values of a first subset of the remote boot parameters for the NVMe subsystem do not match with values of the local boot parameters for the GUID;
in response to determining that the values of the first subset of the remote boot parameters for the NVMe subsystem do not match with the values of the local boot parameters for the GUID, updating the values of the local boot parameters for the GUID to correspond to the values of the first subset of the remote boot parameters of the NVMe subsystem;
determining, based on the comparing, that values of a second subset of the remote boot parameters for the NVMe subsystem match with values of the local boot parameters for the GUID, the second subset of the remote boot parameters differing from the first subset of the remote boot parameters; and
in response to determining that the values of the second subset of the remote boot parameters of the NVMe substation match with the values of the local boot parameters of the GUID, retaining the values of the local boot parameters for the GUID that correspond with the second subset of the remote boot parameters of the NVMe subsystem.

14. The computer-readable medium of claim 13, the operations further comprising accessing the NVMe subsystem based on the updated values of the local boot parameters for the GUID.

15. The computer-readable medium of claim 13, wherein the discovery request is transmitted from an integrated remote access controller.

16. The computer-readable medium of claim 15, wherein the integrated remote access controller transmits the discovery request to the NVMe subsystem over a NVMe management interface (MI).

17. The computer-readable medium of claim 13, wherein the local boot parameters include controller identifier (ID) and namespace identifier (NSID).

18. The computer-readable medium of claim 13, wherein the remote boot parameters include controller identifier (ID) and namespace identifier (NSID).

* * * * *